(12) United States Patent  (10) Patent No.: US 8,181,257 B2
Chalasani et al.  (45) Date of Patent: May 15, 2012

(54) METHOD TO ALLOW ROLE BASED SELECTIVE DOCUMENT ACCESS BETWEEN DOMAINS

(75) Inventors: Raghuveera N. Chalasani, Fairfax, VA (US); Yen-Fu Chen, Austin, TX (US); Barry P. Evans, Cary, NC (US); Hari Shankar, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 11/763,527

(22) Filed: Jun. 15, 2007

(65) Prior Publication Data

US 2008/0313700 A1    Dec. 18, 2008

(51) Int. Cl.
*G06F 7/04* (2006.01)

(52) U.S. Cl. .................. 726/26; 726/1; 726/30; 705/51; 713/176

(58) Field of Classification Search ................ 726/1, 28, 726/30, 26; 705/51; 713/176
See application file for complete search history.

(56) References Cited

U.S. PATENT DOCUMENTS

| 6,585,778 | B1 | 7/2003 | Hind et al. |
| 6,631,371 | B1 | 10/2003 | Lei et al. |
| 6,961,849 | B1 | 11/2005 | Davis et al. |
| 7,395,552 | B2 * | 7/2008 | Taylor et al. ............... 726/28 |
| 7,707,421 | B2 * | 4/2010 | Labelle et al. ............. 713/176 |
| 2005/0021947 | A1 | 1/2005 | Doyle et al. |
| 2005/0039034 | A1 | 2/2005 | Doyle et al. |
| 2005/0065935 | A1 | 3/2005 | Chebolu et al. |
| 2008/0294586 | A1 * | 11/2008 | Lim ........................... 706/47 |

* cited by examiner

*Primary Examiner* — Eleni Shiferaw
*Assistant Examiner* — Paul Callahan
(74) *Attorney, Agent, or Firm* — Jeffrey T. Holman

(57) ABSTRACT

An improved solution for allowing role based selective access to a document between a plurality of domains is provided. In an embodiment of the invention, a method for allowing selective access to a document between a plurality of domains includes: obtaining a composed section of the document at a first domain; applying a security policy at the first domain to the composed section of the document; distributing the security policy from the first domain to a second domain, wherein the second domain is different than the first domain; and applying the security policy to the document at the second domain.

18 Claims, 5 Drawing Sheets

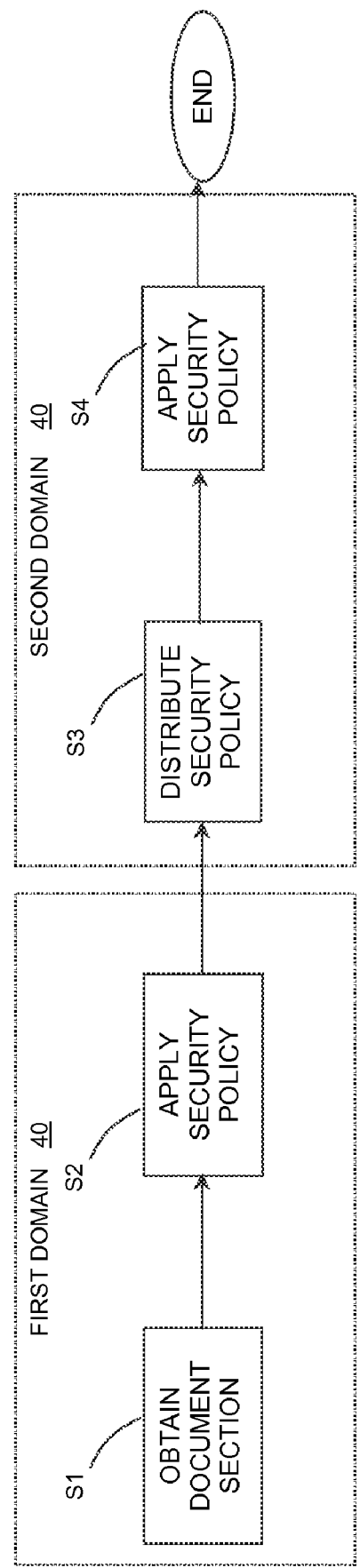

METHOD TO ALLOW ROLE BASED SELECTIVE DOCUMENT ACCESS BETWEEN DOMAINS

FIELD OF THE INVENTION

Aspects of the invention relate generally to document access, and more particularly, to a method, system, and program product to allow role based selective document access between domains, such as business domains.

BACKGROUND OF THE INVENTION

Conventional document security measures exist that attempt to secure the contents of documents from unauthorized access. However, conventional measures do not have sufficient functionality to allow role based selective access to a document between a plurality of domains.

In view of the foregoing, a need exists to overcome one or more of the deficiencies in the related art.

BRIEF SUMMARY OF THE INVENTION

Aspects of the invention provide an improved solution for allowing role based selective access to a document between a plurality of domains.

A first aspect of the invention provides a method for allowing selective access to a document between a plurality of domains, the method comprising: obtaining a composed section of the document at a first domain; applying a security policy at the first domain to the composed section of the document; distributing the security policy from the first domain to a second domain, wherein the second domain is different than the first domain; and applying the security policy to the document at the second domain.

A second aspect of the invention provides a system for allowing selective access to a document between a plurality of domains, the system comprising: a system for obtaining a composed section of the document at a first domain; a system for applying a security policy at the first domain to the composed section of the document; a system for distributing the security policy from the first domain to a second domain, wherein the first domain is different than the second domain; and a system for applying the security policy to the document at the second domain.

A third aspect of the invention provides a computer program comprising program code stored on a computer-readable medium, which when executed, enables a computer system to implement a method for allowing selective access to a document between a plurality of domains, the method comprising: obtaining a composed section of the document at a first domain; applying a security policy at the first domain to the composed section of the document; distributing the security policy from the first domain to a second domain, wherein the first domain is different than the second domain; and applying the security policy to the document at the second domain.

A fourth aspect of the invention provides a method of generating a system for allowing role based selective access to a document between a plurality of domains, the method comprising: providing a computer system operable to: obtain a composed section of the document at a first domain; apply a security policy at the first domain to the composed section of the document; distribute the security policy from the first domain to a second domain, wherein the first domain is different than the second domain; and apply the security policy to the document at the second domain.

A fifth aspect of the invention provides a data processing system for allowing selective access to a document between a plurality of domains, comprising: a processing unit; a bus coupled to the processing unit; and a memory medium coupled to the bus comprising program code, which when executed by the processing unit causes the data processing system to: obtain a composed section of the document at a first domain; apply a security policy at the first domain to the composed section of the document; distribute the security policy from the first domain to a second domain, wherein the first domain is different than the second domain; and apply the security policy to the document at the second domain.

A sixth aspect of the invention provides computer software embodied in at least one propagated signal for allowing selective access to a document between a plurality of domains, the at least one propagated signal comprising instructions for causing at least computer system to: obtain a composed section of the document at a first domain; apply a security policy at the first domain to the composed section of the document; distribute the security policy from the first domain to a second domain, wherein the first domain is different than the second domain; and apply the security policy to the document at the second domain.

A seventh aspect of the invention provides a business method for managing a method for allowing selective access to a document between a plurality of domains, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIGS. 4 shows an illustrative data flow for allowing role based selective access to a document between a plurality of domains according to an embodiment of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved solution for allowing selective access to a document between a plurality of domains. In an embodiment of the invention, a method for allowing selective access to a document between a plurality of domains includes: obtaining a composed section of the document at a first domain; applying a security policy at the first domain to the composed section of the document; distributing the security policy from the first domain to a second domain, wherein the second domain is different than the first domain; and applying the security policy to the document at the second domain. As used herein, unless otherwise noted, the term "set" means one or more (i.e., at least one); the term "domain" means a part or the entirety of a organization; and the phrase "any solution" means any now known or later developed solution.

Figure 1:
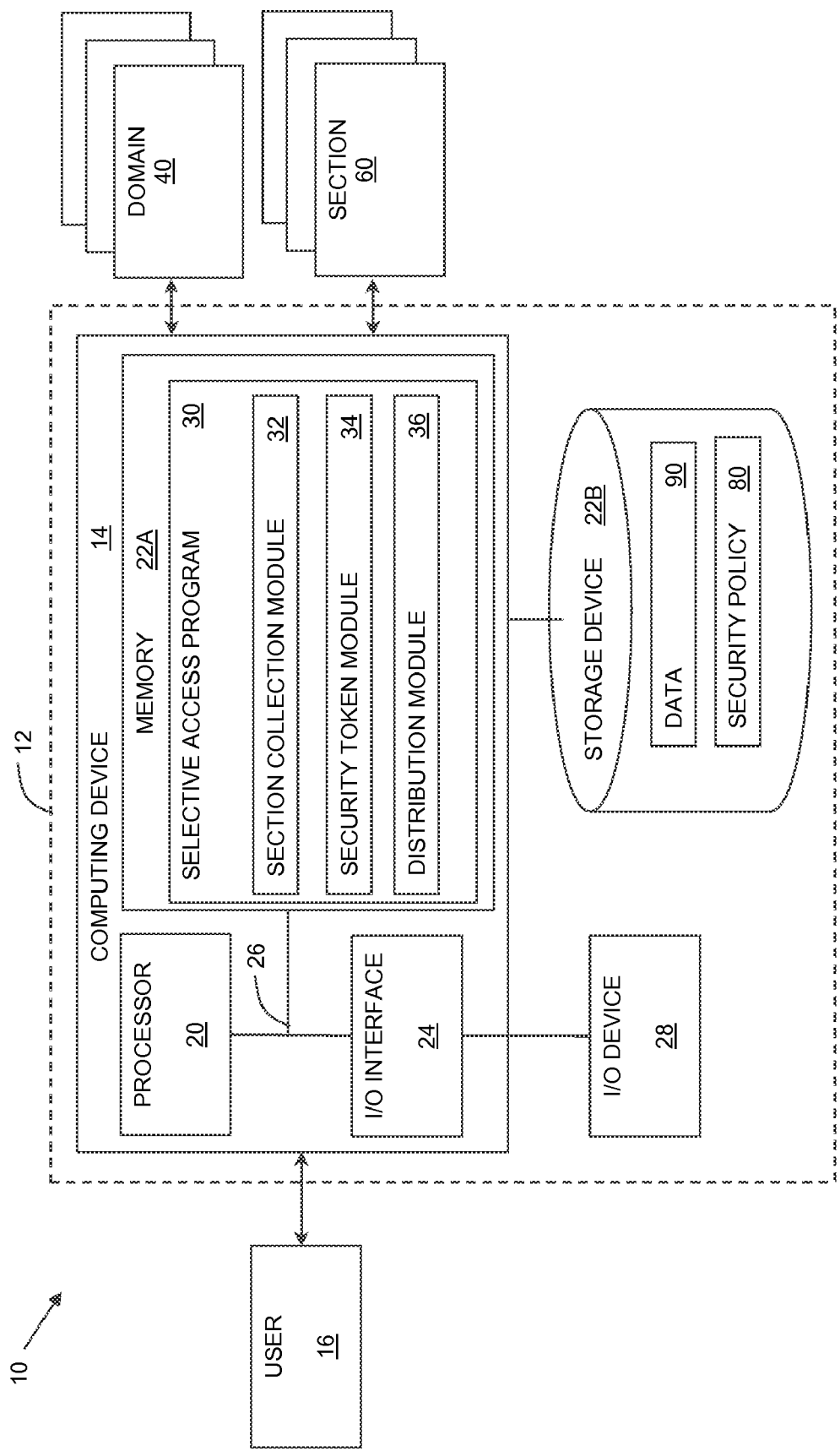
FIG. 1 shows an illustrative environment for employing a method for allowing role based selective access to a document between a plurality of domains according to an embodiment of the invention.

Turning to the drawings, FIG. 1 shows an illustrative environment 10 for employing a method for allowing role based selective access to a document between a plurality of domains according to an embodiment of the invention. To this extent, environment 10 includes a computer system 12 that can perform the process described herein in order to allow role based selective access to a document between a plurality of domains 40. In particular, computer system 12 is shown including a computing device 14 that comprises a selective access program 30, which makes computing device 14 operable for allowing role based selective access to a document between a plurality of domains 40, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as selective access program 30, which is stored in a storage system, such as memory 22A and/or storage device 22B. While executing program code, processor 20 can read and/or write data, such as data 90, security policy 80, etc. to/from memory 22A, storage device 22B, and/or I/O interface 24. Bus 26 provides a communications link between each of the components in computing device 14. I/O device 28 can comprise any device that transfers information between a user 16 and computing device 14 and/or other elements (e.g., domain 40, etc.) and computing device 14. To this extent, I/O device 28 can comprise a user I/O device to enable an individual user 16 to interact with computing device 14 and/or a communications device to enable an element, such as a domain 40, to communicate with computing device 14 using any type of communications link.

In any event, computing device 14 can comprise any general purpose computing article of manufacture capable of executing program code installed thereon. However, it is understood that computing device 14 and selective access program 30 are only representative of various possible equivalent computing devices that may perform the process described herein. To this extent, in other embodiments, the functionality provided by computing device 14 and selective access program 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, selective access program 30 enables computer system 12 to allow role based selective access to a document between a plurality of domains 40. To this extent, selective access program 30 is shown including a section collection module 32, a security token module 34, and a distribution module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Aspects of the invention provide an improved solution for allowing role based selective access to a document between a plurality of domains. To this extent, FIGS. 2, 3A, 3B, and 4 show various scenarios for employing the computer system 12 of FIG. 1, and an illustrative data flow or method for using the modules of selective access program 30 (FIG. 1), respectively, according to embodiments of the invention. For example, a user (e.g., administrator, customer, corporation, company, partnership, group, organization, family, entity, etc.) 16 may need to compose a document 70 for any purpose.

Figure 2:
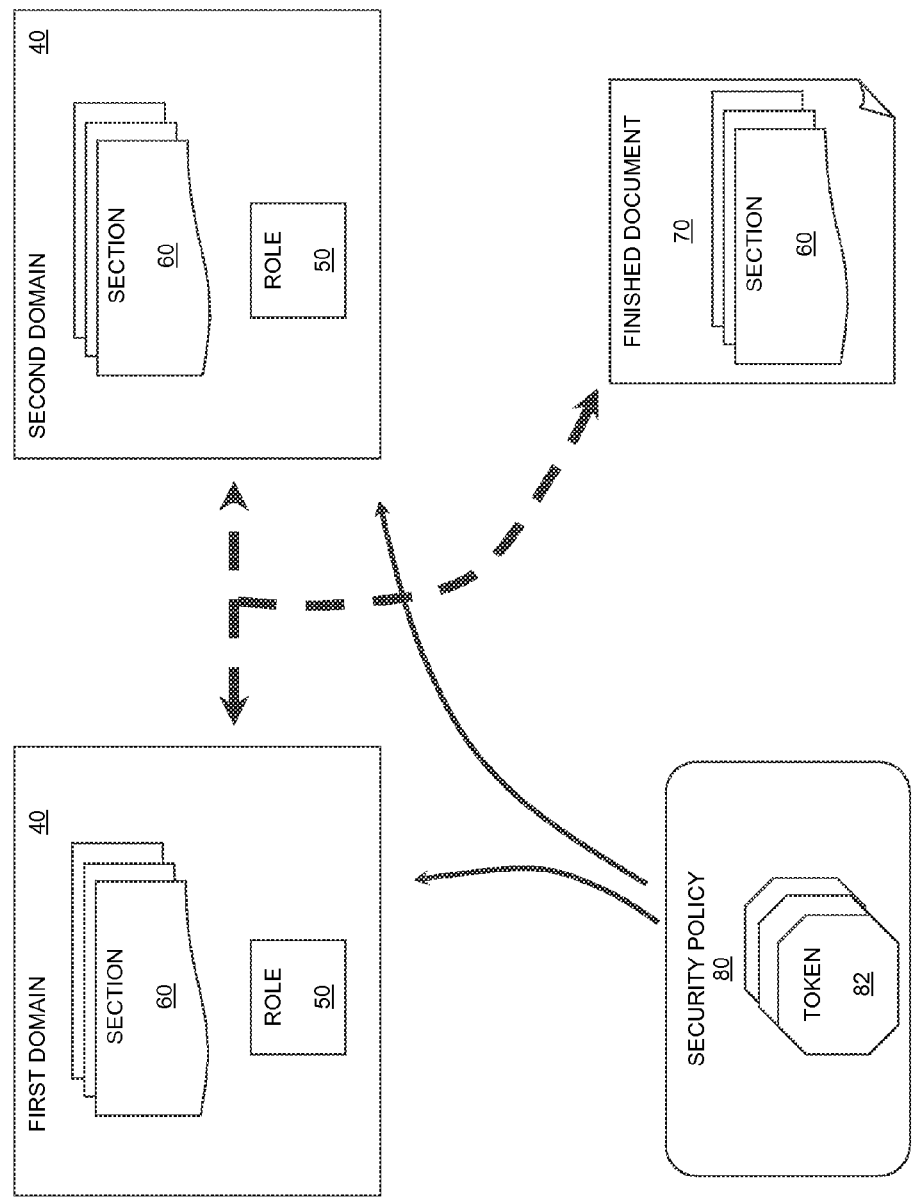
FIG. 2 shows a schematic diagram wherein the environment shown in FIG. 1 may be employed according to an embodiment of the invention.

An embodiment of the present invention is shown in a general schematic view at FIG. 2. A document 70 is created from a plurality of various sections 60, wherein the section(s) 60 are composed and/or located at different domains 40. A security token 82 of a domain 40 is used as the single "sign-on" so that a user 16 (FIG. 1) is compliant with security policy 80 features. In this manner, the usage of the same USERID/password is limited to one domain 40 as to be reused for document composition and access.

FIGS. 2 and 4 together show together a schematic diagram and an illustrative data flow, respectively, of an embodiment of the present invention. A method for allowing role based selective access to a document between a plurality of domains (e.g., "First Domain", "Second Domain") 40 (FIG. 2) wherein, for example, a plurality of domains 40 (e.g., business organization, business units, groups, subsections, etc.) desire to adequately complete a finished document 70 (e.g., contract, etc.) while ensuring that a security policy 80 is complied with in the completion of the document 70.

At each domain 40 there may include at least one section 60 of document 70 that a role 50 in the domain 40 is responsible for. In the illustrative scenario wherein the finished document 70 is a lengthy mergers and acquisition contract, first domain 40 may be tasked with drafting a section 60 of the contract that is related to insurance and indemnification requirements. Similarly, the second domain 40 may be tasked with drafting all other sections 60 of the contract, with the exception of the insurance and indemnification requirements.

As FIG. 4 shows, at S1 a method comprises obtaining a composed section 60 (FIG. 2) of the document at the first domain 40. A security policy 80 (FIG. 2) is applied at the first domain 40 to the composed section 60 of the document at S2. The security policy 80 may comprise access rules. The access rules may be section 60 based, role 50 based, a combination thereof, and/or based on some other factor now known or later developed. Additionally, the security policy 80 may comprise an access level to the sections 60 and/or roles 50 of the document 70. The access levels may include, for example, read-only, write-only, and/or combinations thereof.

In any event, the method may further comprise distributing the security policy 80 from the first domain 40 for the document 70 to the second domain 40 at S3. S4 comprises applying the security policy 80 to the document 70 at the second domain 40. The method may further comprise encrypting one or more sections 60 of the document 70. While a specific quantity of elements (domain 40, role 50, section 60, etc.) are shown in the figures, it should be clear to one of skill that other quantities and/or scenarios are achievable under embodiments of the present invention, while still adhering to the intent thereof. For example, there may be a near limitless quantity of domains 40, sections 60, and/or roles 50. Further, within a single domain 40 may be a plurality of different roles 50 and/or sections 60 of a document. Similarly, different domains 40 and/or roles 50 may have overlapping, concurrent, and/or similar functions for the same sections 60 of the document.

Figure 3A:
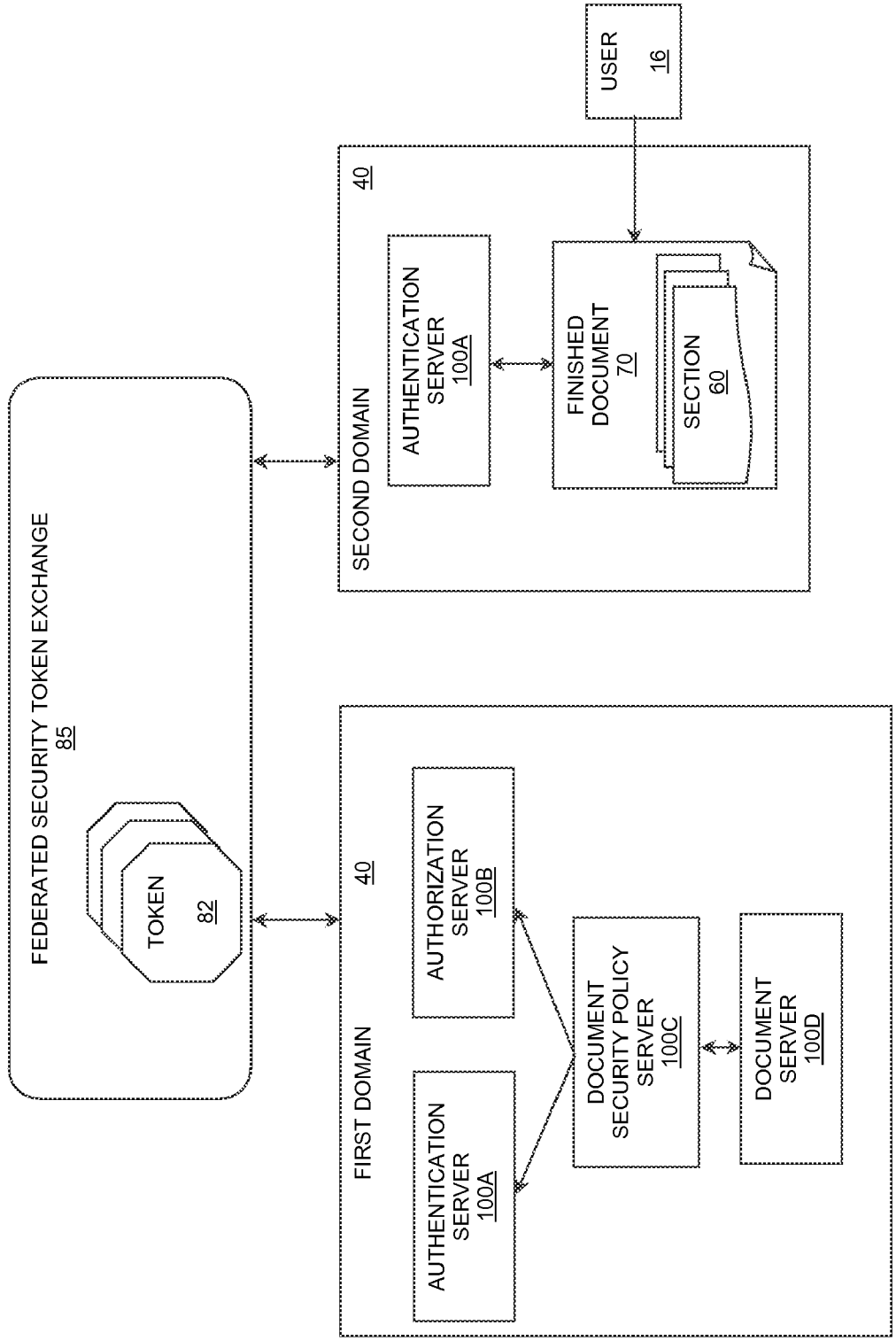
FIGS. 3A-3B show other schematic diagrams wherein the environment shown in FIG. 1 may be employed according to embodiments of the invention.
Figure 3B:
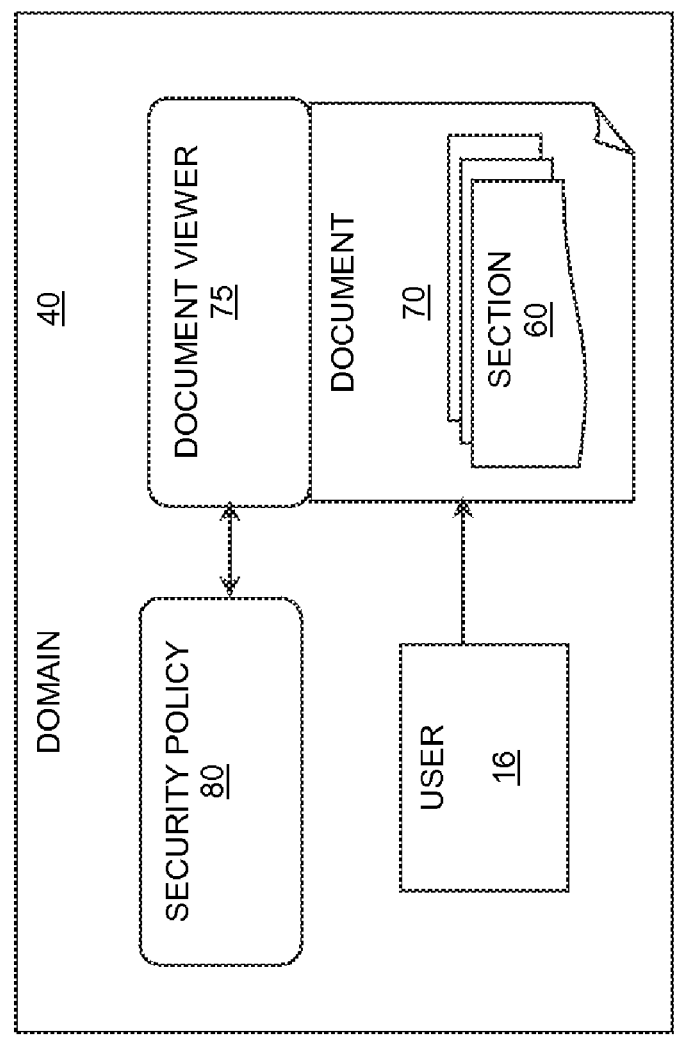

In any event, various other embodiments are possible under the present invention, where only two (e.g., federated security token exchange between domains and an ad-hoc security policy definition and token association with document access) are shown in FIGS. 3A and 3B, respectively.

At FIG. 3A a federated security token exchange 85 between domains 40 embodiment is depicted. This scenario may be employed, for example, when domains 40 are connected. In this scenario, a federated security token 82 and token exchange 85 is issued to access (e.g., view) sections 60 of the document 70 that can be exchanged between domains 40, users 16, and/or the like. In this manner, the scenario may be employed with security requirements and/or access rights for various parts and/or sections 60 of the document 70 itself. Additionally, a security policy 70 may be associated therein that will allow perimeter rules (e.g., access levels in a particular IP address range, clearance levels, clearance groups, etc.) to be used.

In any event, the document 70 may be encrypted by various methods through which documents are generally transmitted (e.g., email, ftp, etc.). As shown various servers 100 may be employed to facilitate the method. For example, each domain 40 comprises an authentication server 100A, an authorization server 100B, a document security policy server 100C, and a document server 100D (only shown for one domain). A goal is to use Web Services Security standards and extend them so as to allow association of required security tokens 82 with the document 70, and exchange tokens 82 with the various security servers 100 via standard security exchange mechanisms. Additionally, Security Assertions Markup Language (SAML) Attribute Query Assertions may be shared as part of the Web Services-Federation Setup to allow domain 40 specific policy checks between various domains 40. The SAML assertion will also allow authenticating or authorizing a user 16 for a particular section 60 of a document 70. The XML encryption and signature specification may be used to allow only a specific domain 40 to have access to that specific section 60 set.

In another embodiment, section 60 specific access rules between domains 40 may use a merging algorithm to merge a variety of sections 60 between various domains 40. The presence of document editors in multiple domains 40 leads to exchange of security tokens 82 between various domains 40 of interest for access and validation based on the party/role. The rules may be defined in a well formatted SAML Attribute Query Assertion Protocol. The protocol will assist to define various actions that are allowed between various document editing entities. The entities may exchange information in SAML assertions, thereby complying with existing Liberty or WS-Federation specification standards. The access rules may be federated or cached locally, per the convenience of the document management system.

At FIG. 3B, an ad-hoc security policy definition and token association with document 70 access embodiment is depicted. This embodiment may entail a scenario wherein domains 40 (only one domain shown) are disconnected. The security policy 80 of the document 70 may be stored locally at domain 40, e.g., on a server, and/or workstation, for example. The access rights of the security policy 80 may be implemented using the document meta-data store which is used by a document viewer 75, based on the support of various policy based features. For example, a feature that is downloaded and/or supported by the document viewer 75 may be a type of access right of the user 16 for the document 70. The access right may, for example, allow read and comments addition for sections 60 (e.g., "sections 4.1, 4.3, and 5.2") of the document 70, while giving write-access to the user 16 for sections "8.2" and "9.1" 60 of the document 70. Another feature may comprise that access rights to document 70 and/or sections 60 can be stored in an ad-hoc basis for a limited time (e.g., one day) locally and controlled (fully, partially, etc.) by a security policy 80 server on another domain 40 (not shown). In this manner, the document 70 is controlled and viewed according to access rights, security polices, and/or expiration rules defined by the "true" owner of the document 70.

In another embodiment, the invention provides a computer program stored on a computer-readable medium, which when executed, enables a computer system to allow role based selective access to a document between a plurality of domains. To this extent, the computer-readable medium includes program code, such as selective access program 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides a method of generating a system for allowing role based selective access to a document between a plurality of domains. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages a method for allowing role based selective access to a document between a plurality of domains, which enables users to perform the process described herein on a subscription, advertising, and/or fee basis. That is, a service provider could offer to manage a network and/or a computer system 12 (FIG. 1) that allows users to manage a method for allowing role based selective access to a document between a plurality of domains as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for allowing selective access to a document between a plurality of domains, the method comprising:
   obtaining a composed section of the document at a first domain using a processor within a computer, wherein the document comprises a plurality of sections;
   applying a security policy at the first domain to the composed section of the document using the processor, the security policy comprising an access level of at least one of: read only or write only, wherein the security policy comprises an access rule that is section based, wherein the security policy requires that a security token be used in order to grant access to the composed section in response to authentication of a user, wherein the security token is associated with the document; and
   distributing the security policy from the first domain to a second domain for applying the security policy to the document at the second domain, wherein the security policy is distributed separately from the document, wherein the second domain is different than the first domain, wherein the security token is distributed from the first domain to be cached locally at the second domain.

2. The method of claim 1, wherein the security policy comprises access rules that are role based.

3. The method of claim 1, wherein at least one of the first and second domain is a business organization.

4. The method of claim 1, wherein the document comprises a plurality of sections.

5. The method of claim 1, further comprising encrypting the document.

6. The method of claim 1, wherein the domains are connected.

7. The method of claim 1, further comprising forwarding the composed section of the document to the second domain.

8. The method of claim 1, the distributing further comprising federating a security token.

9. The method of claim 8, wherein the security token comprises an extensible markup language (XML) file.

10. The method of claim 1, wherein the first domain and the second domain are in a semi-connected environment.

11. A system for allowing selective access to a document between a plurality of domains, the system containing instructions to perform operations executed on a processor within a computer, the operations comprising:
    obtain a composed section of the document at a first domain, wherein the document comprises a plurality of sections, wherein at least one composed section of the document is stored on a hardware storage device at the first domain;
    apply a security policy at the first domain to the composed section of the document, the security policy comprising an access level of at least one of: read only or write only, wherein the security policy comprises an access rule that is section based, wherein the security policy requires that a security token be used in order to grant access to the composed section in response to authentication of a user, wherein the security token is associated with the document; and
    distribute the security policy from the first domain to a second domain for applying the security policy to the document at the second domain, wherein the security policy is distributed separately from the document, wherein the first domain is different than the second domain, wherein the security token is distributed from the first domain to be cached locally at the second domain.

12. The system of claim 11, wherein one of the first and the second domains comprise a business organization and the security policy comprises access rules that are role based.

13. The system of claim 11, further comprising a system for encrypting the document.

14. The system of claim 11, the system for distributing further comprising a system for federating a security token.

15. The system of claim 14, wherein the security token comprises an XML file.

16. The system of claim 11, wherein the first domain and the second domain are in a semi-connected environment.

17. A computer program comprising program code stored on a computer-readable storage device, which when executed on a processor within a computer, causes a computer system to perform operations for allowing selective access to a document between a plurality of domains, the operations comprising:
    obtaining a composed section of the document at a first domain, wherein the document comprises a plurality of sections;
    applying a security policy at the first domain to the composed section of the document, the security policy comprising an access level of at least one of: read only or write only, wherein the security policy comprises an access rule that is section based, wherein the security policy requires that a security token be used in order to grant access to the composed section in response to authentication of a user, wherein the security token is associated with the document; and
    distributing the security policy from the first domain to a second domain for applying the security policy to the document at the second domain, wherein the security policy is distributed separately from the document, wherein the first domain is different than the second domain, wherein the security token is distributed from the first domain to be cached locally at the second domain.

18. The computer program of claim 17, wherein the security policy comprises access rules that are role based.

* * * * *